(12) United States Patent
Wu et al.

(10) Patent No.: US 8,750,381 B2
(45) Date of Patent: Jun. 10, 2014

(54) MOTION ESTIMATION METHOD AND APPARATUS THEREOF

(75) Inventors: Shun-Chen Wu, Hsinchu Hsien (TW); Ying-Chieh Tu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 364 days.

(21) Appl. No.: 12/825,441

(22) Filed: Jun. 29, 2010

(65) Prior Publication Data

US 2011/0001883 A1 Jan. 6, 2011

(30) Foreign Application Priority Data

Jul. 1, 2009 (TW) .............................. 98122243 A

(51) Int. Cl.
*H04N 19/00* (2014.01)
(52) U.S. Cl.
USPC ................................... 375/240.16
(58) Field of Classification Search
CPC ......... H04N 5/14; H04N 11/02; H04N 19/00; H04N 19/00587; H04N 19/0006
USPC .................... 348/699; 375/240.16
See application file for complete search history.

(56) References Cited

U.S. PATENT DOCUMENTS

| 5,682,209 A * | 10/1997 | Borgwardt ..................... 348/699 |
| 2006/0098735 A1* | 5/2006 | Chang ...................... 375/240.12 |
| 2008/0291995 A1* | 11/2008 | Graham et al. .......... 375/240.02 |

FOREIGN PATENT DOCUMENTS

TW 200616462 5/2006

OTHER PUBLICATIONS

Motion Estimation Algorithm for Scalable Hardware Implementation, Konieczny J., Picture Coding Symposium, May 6-8, 2009.*
Taiwan Intellectual Property Office, "Office Action", Jan. 31, 2013, Taiwan.
J. Konieczny, "Motion estimation algorithm for scalable hardware implementation", Picture Coding Symposium, 2009, PCS 2009, May 6-8, 2009.

* cited by examiner

*Primary Examiner* — Y Lee
*Assistant Examiner* — Francis G Geroleo
(74) *Attorney, Agent, or Firm* — WPAT, PC; Justin King

(57) ABSTRACT

A motion estimation method, applied to an image frame having a time constraint, includes calculating an available time for estimating a motion vector of a block unit of the image frame; and selectively performing at least one stage of a plurality of motion estimation stages according to the available time to estimate the motion vector of the block unit.

13 Claims, 5 Drawing Sheets

MOTION ESTIMATION METHOD AND APPARATUS THEREOF

CROSS REFERENCE TO RELATED PATENT APPLICATION

This patent application is based on Taiwan, R.O.C. patent application No. 098122243 filed on Jul. 1, 2009.

FIELD OF THE INVENTION

The present invention relates to a motion estimation mechanism, and more particularly, to a motion estimation method applied to an image processing apparatus and an apparatus thereof.

BACKGROUND OF THE INVENTION

Generally speaking, when motion estimation is performed via a conventional motion estimation algorithm with respect to block units with different image properties, working times for the motion estimation of different block units can be quite different from one another. Therefore, when the conventional motion estimation algorithm is applied for estimating motion vectors of an image frame (e.g., a code of the image frame) having a time constraint, a working time for estimating a motion vector of a certain block unit of the image frame may occupy that of another block unit, thereby deteriorating smoothness of the image frame or efficiency of an overall system. In addition, when motion vectors of block units with different image properties are estimated by different motion estimation algorithms to avoid occurring the foregoing problem, not only quality of the image frame may become worse but also a circuit design of the overall system may be too complicated due to the application of the different motion estimation algorithms.

SUMMARY OF THE INVENTION

Therefore, an object of the present invention is to provide a motion estimation method applied to an image processing apparatus having a time constraint and a motion estimation apparatus thereof, with a circuit design of the motion estimation apparatus being rather simple, so as to solve the foregoing problem in the prior art.

According to an embodiment of the present invention, a motion estimation method, applied to an image processing apparatus, comprises calculating an available time for estimating a motion vector of a block unit of an image frame; and selectively performing at least one stage of a plurality of motion estimation stages according to the available time to estimate the motion vector of the block unit.

According to another embodiment of the present invention, a motion estimation apparatus, comprises a processing circuit, for selectively performing at least one stage of a plurality of motion estimation stages to estimate a motion vector of a block unit of an image frame; and a control circuit, coupled to the processing circuit, for controlling the processing circuit according to an available time to estimate the motion vector of the block unit.

According to the foregoing motion estimation apparatus or the motion estimation method, under a premise that a motion estimation algorithm stays unchanged, motion estimation for different block units are capable of adaptively meeting a real-time processing requirement, so that processing efficiency of an overall system is not deteriorated.

DETAILED DESCRIPTION OF THE PREFERRED EMBODIMENT

Figure 1:
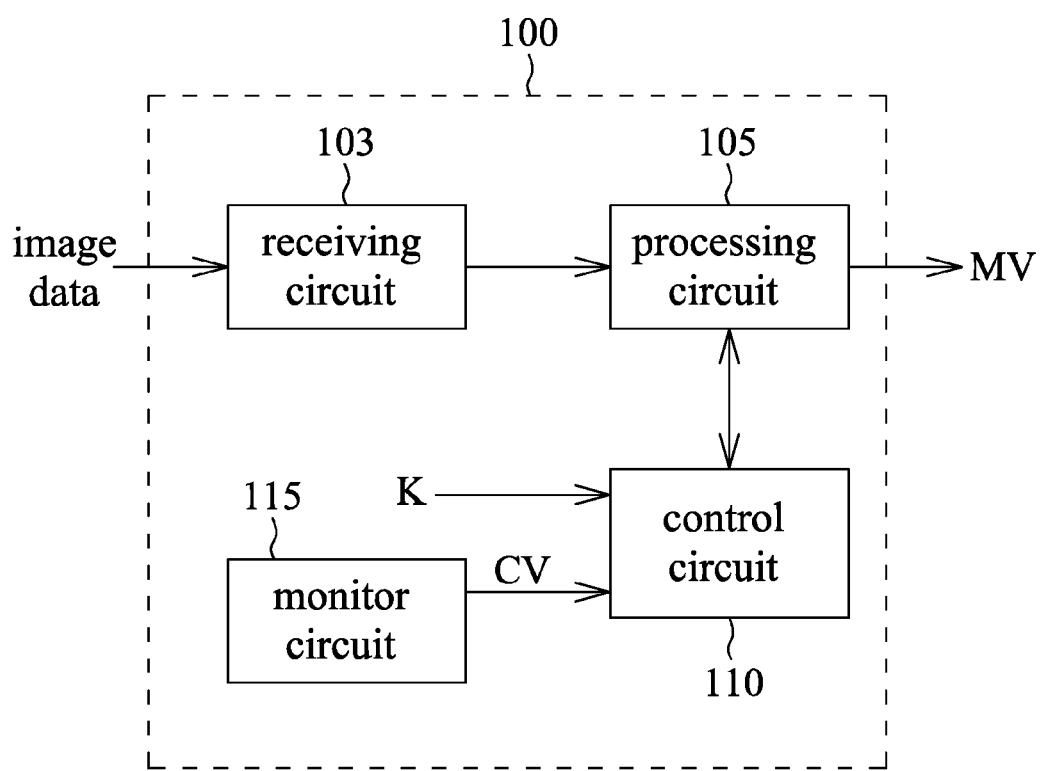
FIG. 1 is a block diagram of a motion estimation apparatus in accordance with an embodiment of the present invention.

FIG. 1 shows a block diagram of a motion estimation apparatus 100 in accordance with an embodiment of the present invention. The motion estimation apparatus 100 comprises a receiving circuit 103, a processing circuit 105, a control circuit 110, and a monitor circuit 115. The motion estimation apparatus 100 performs motion estimation on each of block units of an image frame of an image signal to calculate a motion vector of the each of block units. For example, the motion estimation apparatus 100 can be applied to an encoding flow to generate a motion vector needed for decoding, or is applied to an image processing flow of interpolating and de-interlacing an image. The receiving circuit 103 receives an image data (e.g., an image frame) stored in a memory unit, and the processing circuit 105 searches for a block unit similar to a current block unit according to a predetermined motion estimation algorithm and performs block matching to calculate a motion vector MV. The current block unit is a block unit in an image frame whose motion vector is being estimated by the processing circuit 105. For example, the processing circuit 105 determines the similar block unit according to an algorithm, such as a diamond search (DS) algorithm, a full search motion estimation algorithm, and a three-step search motion estimation. However, the foregoing algorithms shall not be construed as limiting the present invention. The motion estimation algorithm comprises a plurality of motion estimation stages; and each stage consumes time on block matching. Thus, with the time constraint and the nature of different image textures in different block units, the processing circuit 105 may be unable to complete the motion estimation stages within the time constraint. Therefore, in this embodiment, the monitor circuit 115 is for monitoring a working time for estimating the motion vector MV of the current block unit, and the control circuit 110 is for determining whether to stop the processing circuit 105 according to an available time and the required working time determined by the monitor circuit 115. When the processing circuit 105 is stopped, a motion vector calculated by the processing circuit 105 at the time when it is stopped is regarded as the final motion vector MV of the current block unit; otherwise, the motion vector generated when the motion estimation stages are completed is regarded as the final motion vector MV of the current block unit. In other words, the control circuit 110 controls the processing circuit 105 to selectively perform at least one stage of the motion estimation stages according to the available time and the monitor result of the monitor circuit 115, so as to estimate the motion vector MV of the current block unit. In such a situation, although the motion vectors of the block units generated via the motion estimation algorithm do not have a same estimation accuracy, undesirable effects on efficiency of an overall system is avoided.

Figure 2:
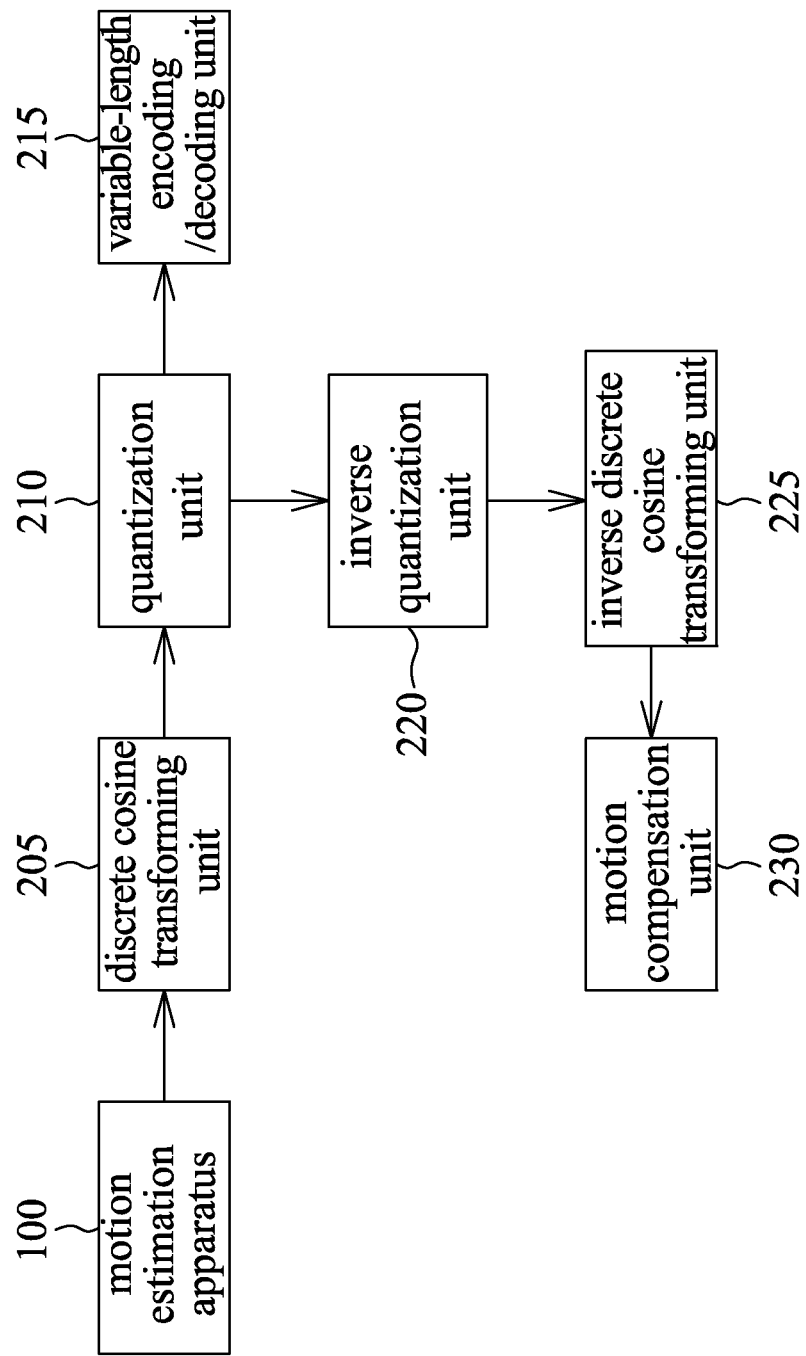
FIG. 2 is a block diagram of the motion estimation apparatus in FIG. 1 applied to an image encoding flow.

More specifically, the motion estimation apparatus 100 in FIG. 1 is applied to an image encoding flow. FIG. 2 shows a block diagram of an image processing apparatus implementing the motion estimation apparatus 100 in FIG. 1 when applied to an image encoding flow. Referring to FIG. 2, in addition to the motion estimation apparatus 100 in this embodiment, the image encoding flow further concerns other circuits, e.g., a discrete cosine transforming unit 205, a quantization unit 210, a variable-length encoding/decoding unit 215, an inverse quantization unit 220, an inverse discrete cosine transforming unit 225, and a motion compensation unit 230. Since the image encoding flow and operations of the foregoing circuit units are readily apparent to a person having ordinary skill in the art, details thereof shall not be described for brevity. It is to be noted that, in a standard Moving Picture Experts Group 4 (MPEG-4) image encoding flow, a bit data stream comprising 30 image frames every second is produced. It implies that, a working time for estimating a motion vector of a macroblock with a 16×16 pixel range in each of image frames is predetermined, so that working times of motion estimation of other block units are not undesirably affected. Therefore, according to the present invention, the available time is regarded as a maximum time for estimating a motion vector of each of the block units, and is an average working time for estimating motion vectors of all block units in an image frame. In an embodiment, the available time is an available working cycle number, which is calculated as:

$$K = \frac{W}{R \times MB_C},$$

where W represents a working frequency of the processing circuit 105, R is a frame rate, and $MB_C$ is a total number of block units comprised in each of the image frames. Therefore, K is the number of working cycles equally allocated to each of the block units, i.e., a maximum number of working cycles consumed by motion estimation for each of the block units. It is to be noted that, since each of the macroblocks with a 16×16 pixel range in the MPEG-4 image encoding flow is regarded as a block unit, when a resolution of an image frame is increased, the total number of the block units in the image frame is also increased. In other words, the calculation of the available working cycle number K is effected by and associated with the resolution of the image frame.

Figure 3:
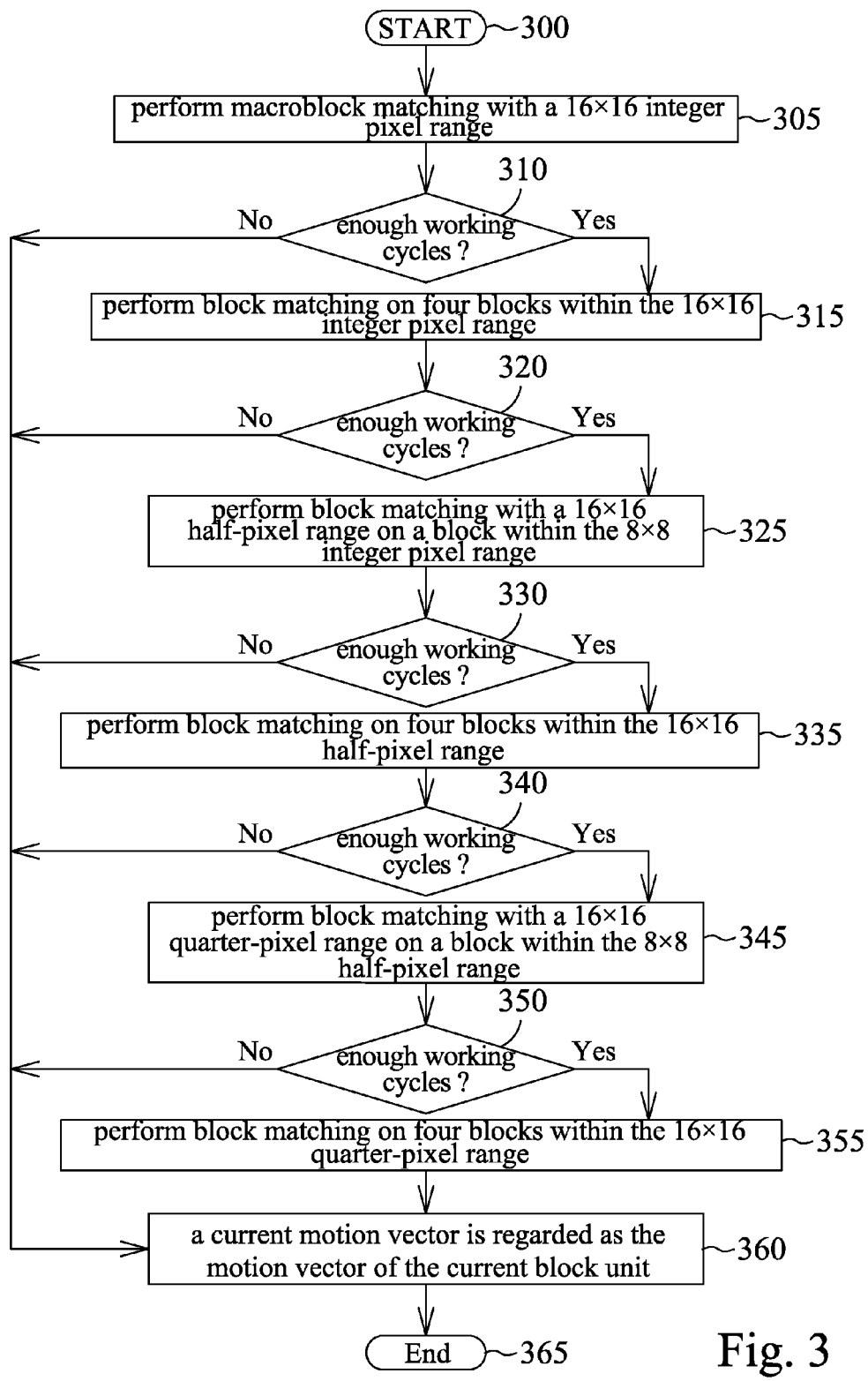
FIG. 3 is a flow chart of performing motion estimation by the motion estimation apparatus in FIG. 1 on a current block unit to estimate a motion vector.

As mentioned above, the monitor circuit 115 monitors the working time for estimating the motion vector MV of the current block unit or a remaining working time. More specifically, in this embodiment, a counter is implemented as the monitor circuit 115 to continuously monitor and accumulate the spent working cycles for estimating the motion vector MV of the current block unit, so as to generate an accumulated working cycle number CV. Therefore, in addition to the available working cycle number K of each block unit, the control circuit 110 also determines whether to stop the processing circuit 105 according to the accumulated working cycle number CV, i.e., which controls the processing circuit 105 to selectively perform at least one stage of the plurality of motion estimation stages. Refer to FIG. 3 showing a flow chart of performing motion estimation by the motion estimation apparatus 100 in FIG. 1 on a current block unit to estimate a motion vector. In this embodiment, the motion estimation apparatus 100 applies the diamond search algorithm that involves six motion estimation stages, with the six stages respectively corresponding to Steps 305, 315, 325, 335, 345 and 355 that perform block matching with different accuracies. Before the six steps, the available working cycle number K is compared with the current accumulated working cycle number CV to determine whether there are enough working cycles for block matching in a next motion estimation stage. Details of the flow are described below.

The flow begins with Step 300. In Step 305, the processing circuit 105 performs macroblock matching with a 16×16 integer pixel range to generate a motion vector $MV_1$. After completing the first stage in Step 305, in Step 310, the control circuit 110 compares the available working cycle number K with the current accumulated working cycle number CV, and determines whether there are enough working cycles for macroblock matching in the next motion estimation stage. When the determination result of Step 310 is positive, Step 315 is performed; otherwise, Step 360 is performed. In Step 315, the processing circuit 105 performs block matching on four blocks within the 16×16 integer pixel range corresponding to the motion vector $MV_1$ to generate a motion vector $MV_2$, wherein each of the four blocks have a 8×8 integer pixel range. In Step 320, the control circuit 110 compares the available working cycle number K with the current accumulated working cycle number CV, and determines whether there are enough working cycles for block matching in the next motion estimation stage. When the determination result of Step 320 is positive, Step 325 is performed; otherwise, Step 360 is performed. In Step 325, the processing circuit 105 performs block matching with a 16×16 half-pixel range on a block within the 8×8 integer pixel range corresponding to the motion vector $MV_2$ to generate a motion vector $MV_3$. In Step 330, the control circuit 110 compares the available working cycle number K with the current accumulated working cycle number CV, and determines whether there are enough working cycles for block matching in the next motion estimation stage. When the determination result of Step 330 is positive, Step 335 is performed; otherwise, Step 360 is performed. In Step 335, the processing circuit 105 performs block matching on four blocks within the 16×16 half-pixel range corresponding to the motion vector $MV_3$ to generate a motion vector $MV_4$, wherein each of the four blocks has an 8×8 half-pixel range. In Step 340, the control circuit 110 compares the available working cycle number K with the current accumulated working cycle number CV, and determines whether there are enough working cycles for block matching in the next motion estimation stage. When the determination result of Step 340 is positive, Step 345 is performed; otherwise, Step 360 is performed. In Step 345, the processing circuit 105 performs block matching with a 16×16 quarter-pixel range on a block within the 8×8 half-pixel range corresponding to the motion vector $MV_4$ to generate a motion vector $MV_5$. In Step 350, the control circuit 110 compares the available working cycle number K with the current accumulated working cycle number CV, and determines whether there are enough working cycles for block matching in the next motion estimation stage. When the determination result of Step 350 is positive, Step 355 is performed; otherwise, Step 360 is performed. In Step 355, the processing circuit 105 performs block matching on four blocks within the 16×16 quarter-pixel range corresponding to the motion vector $MV_5$ to generate a motion vector $MV_6$, wherein each of the four blocks has an 8×8 quarter-pixel range. In Step 360, the control circuit 110 regards a current motion vector generated by the processing circuit 105 as the motion vector MV of the current block unit, and resets the accumulated working cycle number CV to zero. In Step 365, the flow ends.

As mentioned above, Step 305 can be regarded as a first motion estimation stage and Step 315 can be regarded as a second motion estimation stage. In Step 310, the control circuit 110 compares the accumulated working cycle number CV with the available working cycle number K to determine whether the processing circuit 105 continues to perform the second motion estimation stage (Step 315), so as to determine the motion vector MV of the current block unit. In addition, in Step 310, when a difference between the accumulated working cycle number CV and the working cycle number K is smaller than a predetermined working time (i.e., a working time for completing the second motion estimation stage (Step 315)), it means that the working cycles are not enough for block matching in the next motion estimation stage, and the flow performs Step 360. In Step 360, the control circuit 110 controls the processing circuit 105 to apply the motion vector $MV_1$ generated in the first motion estimation calculation as the motion vector MV of the current block unit and does not continue to Step 315. For example, the foregoing predetermined working time may be, the working time of the second motion estimation calculation plus a buffer period, or an average working time of the second motion estimation calculation plus a buffer period.

However, when the difference between the accumulated working cycle number CV and the working cycle number K is not smaller than the predetermined working time (i.e., the working time for completing the second motion estimation calculation (Step 315)), the control circuit 110 informs the processing circuit 105 to continue to perform Step 315, so as to generate another motion vector serving as a reference for determining the motion vector MV of the current block unit. In other words, in Step 360, when the processing circuit 105 completes the six motion estimation stages, the control circuit 110 regards the motion vector $MV_6$ as the motion vector MV of the current block unit; otherwise, the control circuit 110 first stops the processing circuit, and then regards the current motion vector generated by the processing circuit 105 as the motion vector MV of the current block unit. For example, in Step 340, when the control circuit 110 determines that the working cycles are not enough, the flow performs Step 360 in which the control circuit first stops the processing circuit 105, and then regards the motion vector $MV_4$ generated in Step 335 as the motion vector MV of the current block unit.

It is to be noted that, according to the present invention, neither the first motion estimation stage is limited to that described in Step 305, nor the second motion estimation stage is limited to that described in Step 315. Instead, the description is to explain that it is determined whether to perform the second motion estimation stage only after the first motion estimation stage is completed. Therefore, the first and second motion estimation stages may be operations of other steps, e.g., the first and second motion estimation stages are respectively operations of Step 325 and Step 335. In addition, an estimation accuracy of the first motion estimation stage is lower than that of the second motion estimation stage, i.e., estimation accuracies of Step 305, Step 315, Step 325, Step 335, Step 345 and Step 355 are increments in order.

Figure 4:
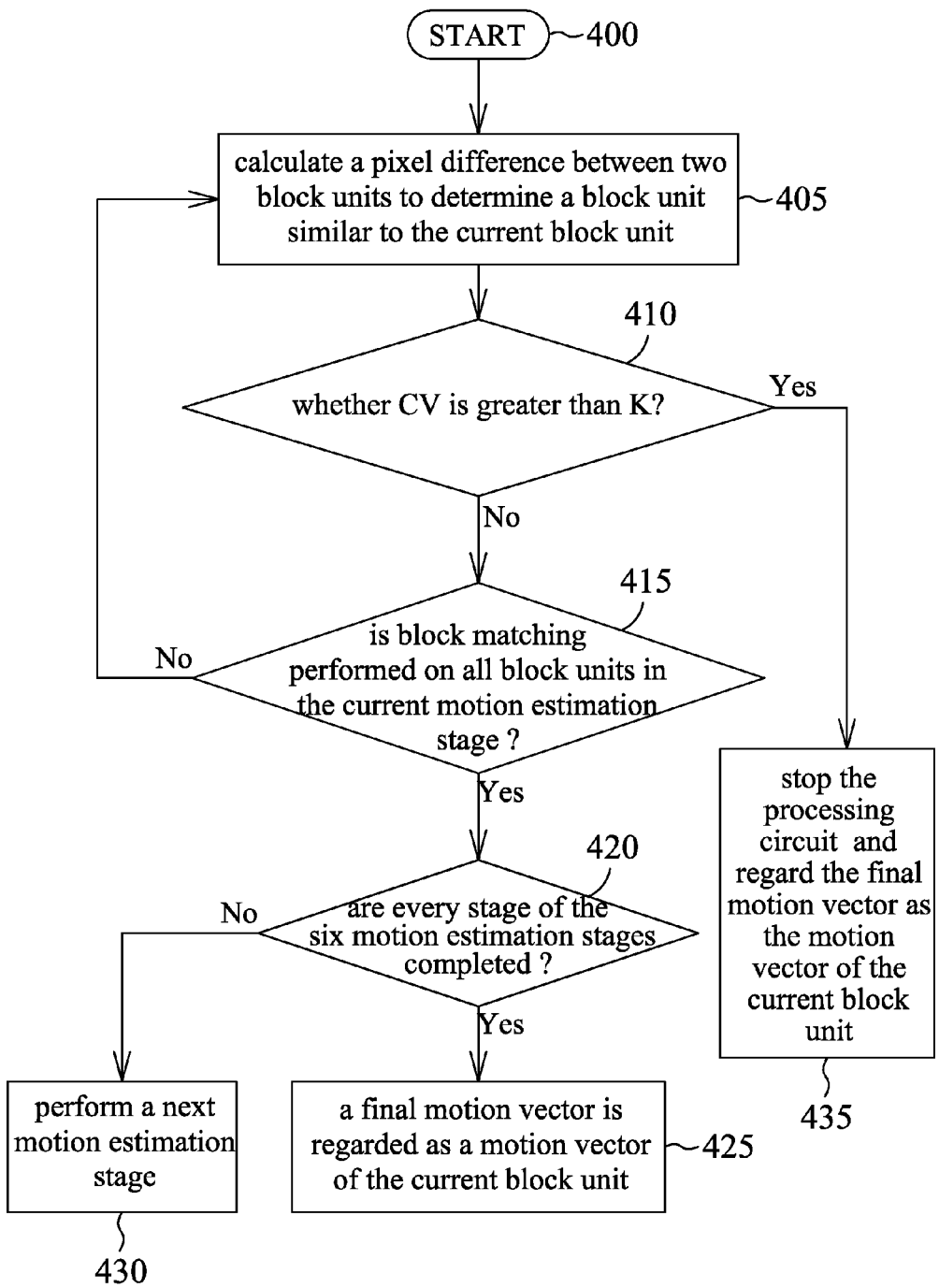
FIG. 4 is a flow chart of performing motion estimation by the motion estimation apparatus in FIG. 1 on a current block unit via another approach to estimate a motion vector.

FIG. 4 shows a flow chart of performing motion estimation by the motion estimation apparatus 100 in FIG. 1 on a current block unit via another approach. In this embodiment, the motion estimation apparatus 100 also implements the diamond search algorithm, which is a six-stage motion estimation, and each of the stages comprises steps below.

The flow begins with Step 400. In Step 405, when block matching is performed, the processing circuit 105 calculates a pixel difference between two block units to determine a block unit similar to the current block unit. In Step 410, the control circuit 110 compares the predetermined working cycle number K with a current accumulated working cycle number CV, and determines whether the current accumulated working cycle number CV is greater than the working cycle number K. When the determination result of Step 410 is positive, Step 425 is performed; otherwise, Step 415 is performed. In Step 415, it is determined whether block matching is performed on all block units in the current motion estimation stage. When the determination result of Step 415 is positive, Step 420 is performed; otherwise, Step 405 is performed. In Step 420, it is determined that whether every stage of the six motion estimation stages are completed. When the determination result of Step 420 is positive, Step 425 is performed; otherwise, Step 430 is performed. In Step 425, the control circuit 110 regards a final motion vector as a motion vector MV of the current block unit. In Step 430, the processing circuit 105 performs a next motion estimation stage. In Step 435, the processing circuit 110 stops the processing circuit 105, and regards the final motion vector generated by the processing circuit 105 as the motion vector MV of the current block unit.

In the embodiment in FIG. 4, the processing circuit 105 compares the current block unit with different block units to determine the similar block unit until the current accumulated working cycle number CV is greater than the available working cycle number K, or until every stage of the six motion estimation stages is completed. Therefore, a protection time is reserved in this embodiment to prevent the estimation of the motion vector MV of the current block unit from occupying a working time for estimating a motion vector of a next block unit. In addition, an object of Step 410 is to determine whether the processing circuit 105 continues to perform the current motion estimation stage from comparing the accumulated working cycle number CV with the available working cycle number K by the control circuit 110. When the accumulated working cycle number CV is greater than the available working cycle number K, the control circuit 110 informs the processing circuit 105 to stop the current motion estimation stage, and regards a motion vector calculated before the stop as the motion vector MV of the current block unit. In addition, when the accumulated working cycle number CV is not greater than the available working cycle number K, the control circuit 110 controls the processing circuit 105 to continue to perform the current motion estimation stage, so as to determine the motion vector MV of the current block unit.

In addition, for the first motion estimation stage (e.g., macroblock matching with a 16×16 integer pixel range), the operation for determining whether the accumulated working cycle number CV is greater than the available working cycle number K in Step 410 is optional, and is not a limitation to the present invention. Operations in Step 420 to Step 435 are for illustrating relationships between various stages of the motion estimation and illustrating approaches for generating the motion vector MV of the current block unit, and shall not be construed as limiting the present invention, either. In flows of other embodiment, each stage of the motion estimation may not comprise the foregoing steps, and proper modifications of the flow of the embodiment in FIG. 4 are within the spirit and scope of the present invention.

In another embodiment, before the motion estimation is performed, the working cycle number CV monitored by the monitor circuit 115 is defined as being equal to the working cycle number K; i.e., the working cycle number CV monitored is set as being equal to the available working cycle number K during initialization. After that, the working time for each block matching performed by the processing circuit 105 is subtracted one after another from the working cycle number CV until the working cycle number becomes zero or a negative value. Therefore, the working cycle number CV is the available remaining working cycle, and the control circuit 110 directly determines whether to stop the processing circuit 105 according to the working cycle number CV. Likewise, the control circuit 110 may be designed as determining whether there are enough working cycles for block matching of a next motion estimation stage. The foregoing design variations are within the spirit and scope of the present invention.

Figure 5:
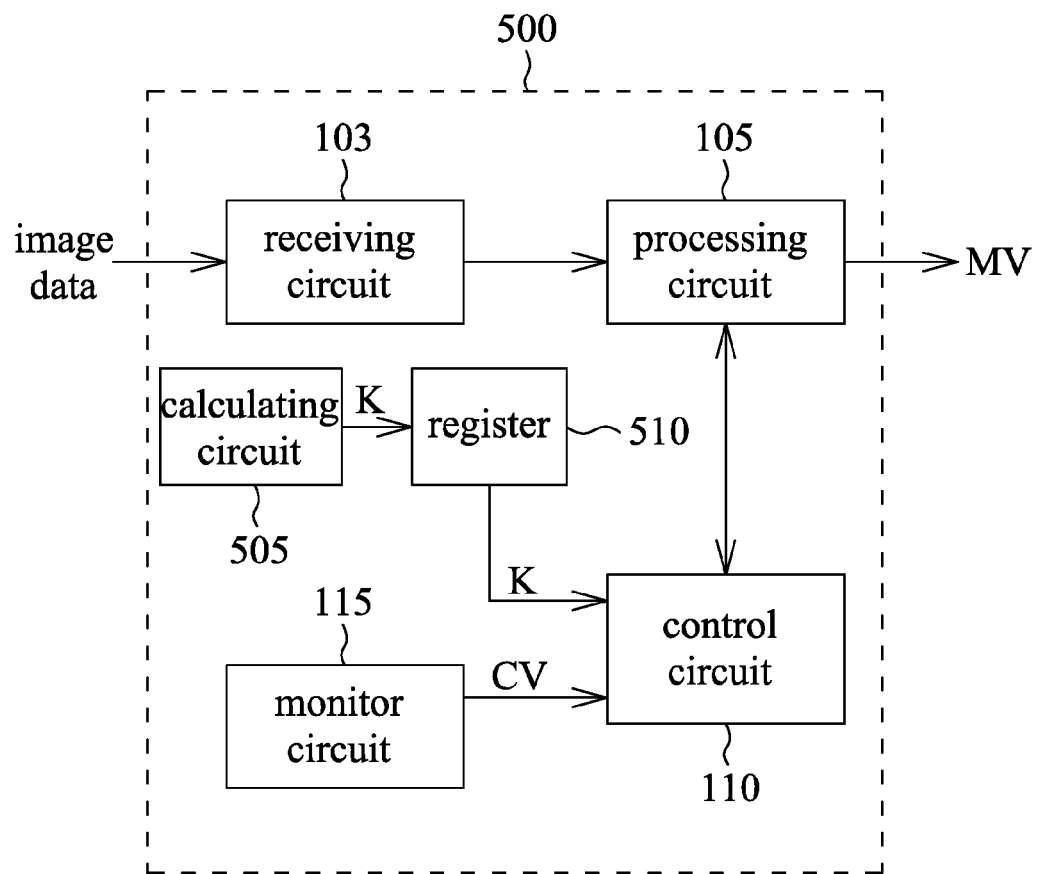
FIG. 5 is a block unit diagram of a motion estimation apparatus in accordance with another embodiment of the present invention.

In another embodiment, the motion estimation apparatus may further comprise a calculation circuit and a register. Refer to FIG. 5 showing a block diagram of a motion estimation apparatus 500 in accordance with another embodiment of the present invention. In addition to the receiving circuit 103, the processing circuit 105, the monitor circuit 115, and the control circuit 110, the motion estimation apparatus 500 further comprises a calculation circuit 505, and a register 510. The calculating circuit 505 calculates the working cycle number K according to a working frequency, an image frame rate and the number of block units of an image frame, and the image frame rate is a speed of the image frame of an image signal. The register 510 stores the calculated working cycle number K, and thus when the image frame rate (or a frame rate) changes or a total number of the block units of the image frame changes, the motion estimation apparatus 500 can automatically and immediately updates the working cycle number K to meet a real-time processing requirement.

In conclusion, according to an embodiment of the present invention, under a premise that a motion estimation algorithm stays unchanged, a motion estimation apparatus performing motion estimation with respect to different block units is capable of adaptively meeting the real-time processing requirement, so that processing efficiency of the overall system is not deteriorated.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A motion estimation method, comprising:
    calculating an available time, wherein the available time is regarded as a maximum time for estimating a motion vector of a block unit of an image frame;
    accumulating a working time for estimating the motion vector of the block unit of the image frame; and
    selectively performing at least one stage of a plurality of motion estimation stages according to the available time, wherein the motion estimation stages comprise a first motion estimation stage and a second motion estimation stage;
    determining at completion of the first motion estimation stage whether to selectively perform the second motion estimation stage by comparing the accumulated working time with the available time;
        wherein when a difference between the accumulated working time and the available time is smaller than a predetermined value, utilizing a first motion vector generated via the first motion estimation stage as a final motion vector of the block unit without continuing to perform the second motion estimation stage; and
        wherein when the difference between the accumulated working time and the available time is not smaller than the predetermined value, continuing to perform the second motion estimation stage;
        wherein the predetermined value is defined as an average working time of the second motion estimation stage plus a buffer period.

2. The motion estimation method as claimed in claim 1, wherein an estimation accuracy of the first motion estimation stage is lower than that of the second motion estimation stage.

3. The motion estimation method as claimed in claim 1, wherein the step of selectively performing the at least one stage of the motion estimation stages according to the available time and the accumulated working time further comprises:
    comparing the accumulated working time with the available time to determine whether to continue performing a current motion estimation stage.

4. The motion estimation method as claimed in claim 3, wherein the step of comparing the accumulated working time with the available time to determine whether to continue performing the current motion estimation stage further comprises:
    when the accumulated working time is greater than the available time, stopping the current motion estimation stage, and utilizing a first motion vector calculated before stopping the current motion estimation stage as a final motion vector of the block unit; and
    when the accumulated working time is not greater than the available time, continuing performing the current motion estimation stage.

5. The motion estimation method as claimed in claim 1, wherein the available time is a number of available cycles.

6. The motion estimation method as claimed in claim 5, wherein the number of available cycles is generated according to a working frequency, an image frame rate, and a total number of block units of the image frame.

7. The motion estimation method as claimed in claim 6, wherein the number of available cycles conforms to an equation $$K = \frac{W}{R \times MB_C},$$

K is the number of available cycles, W is the working frequency, R is the image frame rate, and MBC is the total number of block units of the image frame.

8. A motion estimation apparatus, for estimating a motion vector of a block unit of an image frame, comprising:
    a processing circuit, for selectively performing at least one stage of a plurality of motion estimation stages to estimate the motion vector of the block unit, wherein the motion estimation stages comprise a first motion estimation stage and a second motion estimation stage;
    a monitor circuit, for generating a accumulated working time of estimating the motion vector of the block unit; and
    a control circuit, for controlling the processing circuit to determine at completion of the first motion estimation stage whether to selectively perform the second motion estimation stage by comparing the accumulated working time with an available time, wherein the available time is regarded as a maximum time for estimating a motion vector of a block unit of an image frame;

wherein when a difference between the accumulated working time and the available time is smaller than a predetermined value, utilizing a first motion vector generated via the first motion estimation stage as a final motion vector of the block unit without continuing to perform the second motion estimation stage; and wherein when the difference between the accumulated working time and the available time is not smaller than the predetermined value, continuing to perform the second motion estimation stage;

wherein the predetermined value is defined as an average working time of the second motion estimation stage plus a buffer period.

9. The motion estimation apparatus as claimed in claim 8, wherein an estimation accuracy of the first motion estimation stage is lower than that of the second motion estimation stage.

10. The motion estimation apparatus as claimed in claim 8, wherein the control circuit compares the accumulated working time with the available time to determine whether the processing circuit is to continue performing a current motion estimation stage.

11. The motion estimation apparatus as claimed in claim 10, wherein when the processing circuit is performing the current motion estimation stage and the accumulated working time is greater than the available time, the control circuit informs the processing circuit to stop the current motion estimation stage, and utilizes a first motion vector calculated before stopping the current motion estimation stage as a final motion vector of the block unit.

12. The motion estimation apparatus as claimed in claim 8, wherein the available time is a number of available cycles, and the motion estimation apparatus further comprises:

a calculation circuit, for calculating the number of the available cycles according to a working frequency, an image frame rate and a number of block units of the image frame; and a register, for storing the number of the available cycles.

13. The motion estimation apparatus as claimed in claim 12, wherein the number of the available cycles conforms to an equation $$K = \frac{W}{R \times MB_C},$$

K is the number of the available cycles, W is the working frequency, R is the image frame rate, and MBC is the total number of block units of the image frame.

* * * * *